(12) United States Patent
Yamashita

(10) Patent No.: US 8,306,767 B2
(45) Date of Patent: Nov. 6, 2012

(54) SENSOR OUTPUT CORRECTING DEVICE

(75) Inventor: Toshiyuki Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 297 days.

(21) Appl. No.: 12/666,201

(22) PCT Filed: Jun. 16, 2008

(86) PCT No.: PCT/JP2008/001548
§ 371 (c)(1),
(2), (4) Date: Dec. 22, 2009

(87) PCT Pub. No.: WO2009/031256
PCT Pub. Date: Mar. 12, 2009

(65) Prior Publication Data
US 2010/0191494 A1 Jul. 29, 2010

(30) Foreign Application Priority Data
Sep. 3, 2007 (JP) .................................. 2007-227955

(51) Int. Cl.
*G01D 18/00* (2006.01)
*G01D 21/00* (2006.01)
*G01P 21/00* (2006.01)

(52) U.S. Cl. ............. 702/87; 702/88; 702/104; 702/106

(58) Field of Classification Search .................... 702/87, 702/88, 104, 106
See application file for complete search history.

(56) References Cited

U.S. PATENT DOCUMENTS

| | | | |
|---|---|---|---|
| 5,307,274 A * | 4/1994 | Takata et al. | 701/70 |
| 5,764,541 A | 6/1998 | Hermann et al. | |
| 6,904,379 B1 * | 6/2005 | Hanzawa et al. | 702/106 |
| 7,841,453 B2 * | 11/2010 | Gold et al. | 190/102 |
| 2005/0033496 A1 | 2/2005 | Iyoda et al. | |
| 2005/0126288 A1 | 6/2005 | Gahn et al. | |

FOREIGN PATENT DOCUMENTS

| | | |
|---|---|---|
| DE | 103 57 870 A1 | 7/2005 |
| DE | 10 2006 024 312 A1 | 9/2007 |
| JP | 7-128062 A | 5/1995 |
| JP | 9-318403 A | 12/1997 |
| JP | 2001-141758 A | 5/2001 |
| JP | 2005-41258 A | 2/2005 |
| JP | 3808912 B2 | 8/2006 |

\* cited by examiner

*Primary Examiner* — Janet Suglo
(74) *Attorney, Agent, or Firm* — Birch, Stewart, Kolasch & Birch, LLC

(57) ABSTRACT

A sensor output correcting device includes: a sensor element for detecting a variation in an object to be measured, and for outputting this variation as a signal; an A/D converter for converting the analog signal outputted from the sensor element into a digital signal; a zero reference value calculating unit for calculating a zero reference value which is a drift amount of the sensor element from the signal outputted from the sensor element; a zero point correcting unit for correcting a zero point of the signal outputted from the A/D converter on the basis of the zero reference value calculated by the zero criterion calculating unit; an output limiting unit for limiting a value of an output signal inputted from the zero point correcting unit on the basis of a correction amount provided by the zero point correcting unit, and a high frequency removing unit for removing a high frequency component.

3 Claims, 9 Drawing Sheets (a) Sensor Element 11

(b) Zero Reference Value Calculating Unit 16

(c) Zero Point Correcting Unit 13

(a) State in Which No Drift Component Has Occurred (b) State in Which a Drift Component Has Occurred

SENSOR OUTPUT CORRECTING DEVICE

FIELD OF THE INVENTION

The present invention relates to a sensor output correcting device that detects a variation in an object to be measured and outputs a value showing this variation as a signal.

BACKGROUND OF THE INVENTION

A conventional sensor output correcting device is comprised of a sensor element for detecting a variation in an object to be measured and for outputting a value according to this variation as a signal, an A/D (Analog/Digital) converting unit for converting the analog signal outputted from the above-mentioned sensor element into a digital signal, a zero point correcting unit for correcting the zero point of the signal outputted from the above-mentioned A/D converter, and a high frequency removing unit for removing a high frequency component from the signal outputted from the above-mentioned zero point correcting unit.

FIG. 10 is a view showing a flow of signal processing by taking an acceleration sensor as an example of conventional sensor output correcting devices. The waveform of an output signal which is outputted from the sensor element of the acceleration sensor of a vehicle when the vehicle is travelling a rough road or is being submitted to a hammering test has a feature of having approximate symmetry. FIG. 10(a) is a view showing the signal outputted from the sensor element at the time when the vehicle is travelling a rough road or is being submitted to a hammering test. FIG. 10(b) is a view showing an A/D-converted signal outputted from an A/D converter. Because the A/D converter has a predetermined output range, the A/D converter does not output any signal having a larger value than a maximum value Gmax of the output range, and any signal having a smaller value than a minimum value Gmin of the output range. G0 shows the zero point (zero reference value) of the signal outputted from the sensor element, and the zero point is shifted upwardly from the center of the output range of the A/D converter due to occurrence of a drift voltage resulting from an environmental factor.

FIG. 10(c) is a view showing the signal whose zero point has been corrected by the zero point correcting unit. In this case, because the A/D converter does not output any signal having a larger value than Gmax, the waveform of the signal whose zero point has been corrected is asymmetrical. FIG. 10(d) shows a signal which the high frequency removing unit has acquired by processing the zero-point corrected signal outputted from the zero point correcting unit. When the signal outputted from the sensor element has a drift, the waveform of the signal outputted from the zero point correcting unit does not have symmetry as shown in FIG. 10(d), and a signal resulting from the drift is outputted from the high frequency removing unit after being processed by the high frequency removing unit. Therefore, in the conventional acceleration sensor, the output range of the A/D converter is preset to a large value in consideration of a drift amount in such a way that the waveform of the zero-point corrected signal has symmetry. A problem is however that the increase in the output range results in reduction in the resolution of the A/D converter.

In order to solve the above-mentioned problem, there is disclosed a sensor output correcting device that stores the drift amount of a sensor element when the vehicle is stationary, and, after subtracting the drift amount from the value outputted from the sensor element when the vehicle is travelling so as to correct the zero point of the outputted value, performs A/D conversion on this corrected value (for example, refer to patent reference 1).
[Patent reference 1] JP,7-128062,A A problem with conventional sensor output correcting devices constructed as mentioned above is that in order to perform A/D conversion on a zero-point corrected signal outputted from a sensor element, a storage unit for storing a drift amount, a circuit for feeding back the stored drift amount, etc. have to be disposed, and therefore the circuit structure becomes complicated.

The present invention is made in order to solve the above-mentioned problem, and it is therefore an object of the present invention to provide a sensor output correcting device that can suppress reduction in the resolution of A/D conversion without having to have a complicated circuit structure, and that does not output any signal resulting from a drift.

DISCLOSURE OF THE INVENTION

A sensor output correcting device in accordance with the present invention is characterized in including an output limiting unit for limiting a value of an output signal on the basis of a correction amount provided by a zero point correcting unit.

Because the sensor output correcting device in accordance with the present invention includes the output limiting unit for limiting the value of the output signal on the basis of the correction amount provided by the zero point correcting unit, the sensor output correcting device has an advantage of being able to suppress reduction in the resolution of A/D conversion without having to have a complicated circuit structure, and prevent any signal resulting from a drift from being outputted.

PREFERRED EMBODIMENTS OF THE INVENTION

Hereafter, a preferred embodiment of the present invention will be described with reference to the accompanying drawings.

Embodiment 1

Figure 1:
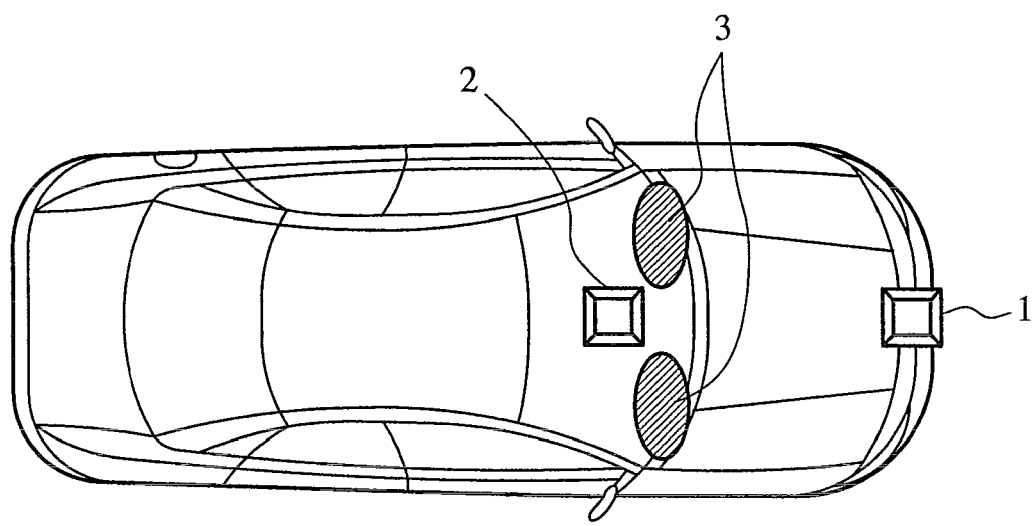
FIG. 1 is a schematic diagram of an airbag deployment system in accordance with this Embodiment 1.

FIG. 1 is a schematic diagram showing a sensor output correcting device in accordance with this Embodiment 1 which is applied to a front acceleration sensor 1 of an airbag deployment system (a moving object protection system) of a vehicle. The airbag deployment system is comprised of the front acceleration sensor 1 (the sensor output correcting device) that detects the acceleration of the vehicle to output an acceleration signal, and an airbag control unit (a determining device) 2 that determines whether to activate airbags (protection members) 3 according to the acceleration signal outputted from the front acceleration sensor 1. In this Embodiment 1, the front acceleration sensor 1 will be explained as an example of the sensor output correcting device, though the application of the sensor output correcting device is not limited to the front acceleration sensor 1, but can be applied to another sensor. The airbags 3 protect objects to be protected including passengers and walkers. Furthermore, the airbags can be applied not only to a vehicle but also to various moving objects, such as a train and a ship.

Figure 2:
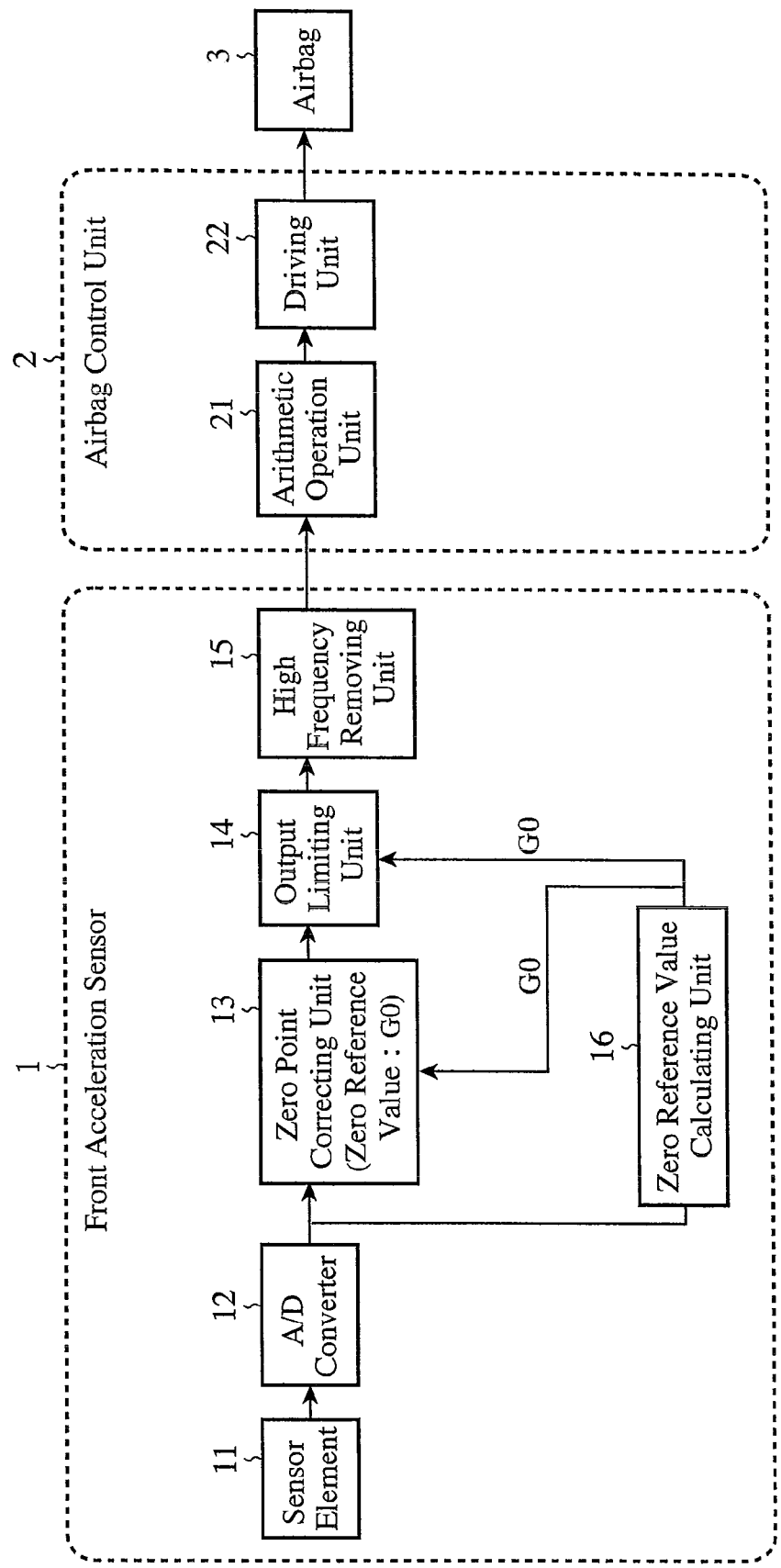
FIG. 2 is a block diagram of the airbag deployment system in accordance with this Embodiment 1.

FIG. 2 is a configuration diagram of the airbag deployment system, and the airbag deployment system is comprised the front acceleration sensor 1, the airbag control unit 2, and the airbags 3.

The front acceleration sensor 1 includes a sensor element 11 for detecting the acceleration of a front portion of the vehicle to output a signal having a value according to this acceleration, an A/D converter 12 for converting the analog signal outputted from the sensor element 11 into a digital signal, a zero reference value calculating unit 16 for calculating a zero reference value which is a drift amount of the sensor element 11 from the signal outputted from the sensor element 11, a zero point correcting unit 13 for correcting the zero point of the signal outputted from the A/D converter 12 on the basis of the zero reference value calculated by the zero reference value calculating unit 16, an output limiting unit 14 for limiting the value of the output signal outputted from the zero point correcting unit 13 on the basis of a correction amount provided by the zero point correcting unit 13 in such a way that the waveform of the signal outputted from the zero point correcting unit 13 has symmetry, i.e., the positive region and the negative region of the signal become equal to each other, and a high frequency removing unit 15 for removing a high frequency component.

The airbag control unit 2 includes an arithmetic operation unit 21 for performing an arithmetic operation on the signal outputted from the front acceleration sensor 1 to provide an instruction for deploying the airbags 3, and a driving unit 22 for deploying the airbags 3 on the basis of the instruction from the arithmetic operation unit 21.

Figure 3:
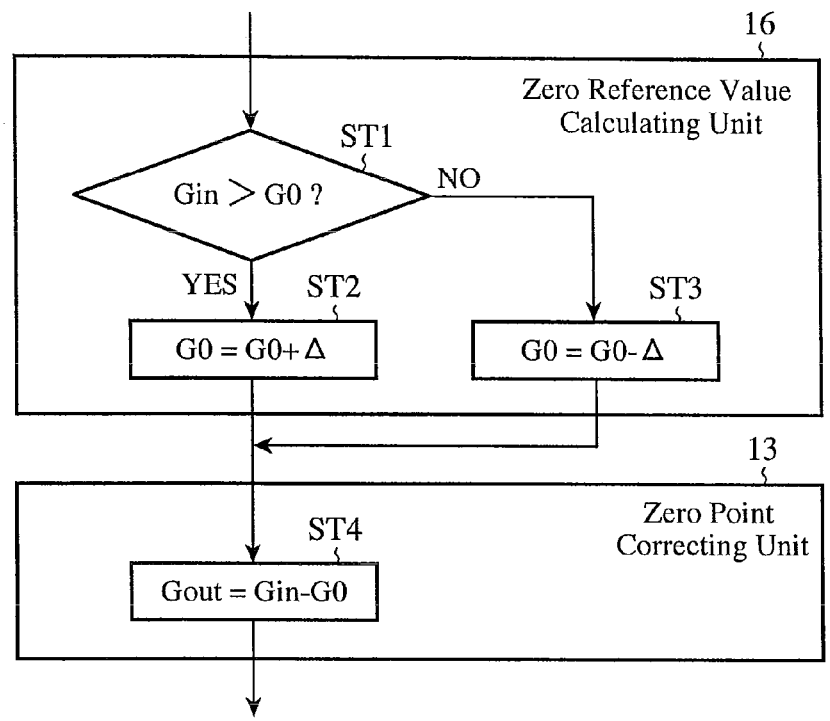
FIG. 3 is a flow chart showing processing carried out by a zero reference value calculating unit 16 and a zero point correcting unit 13.

FIG. 3 is a flow chart showing processing carried out by the zero reference value calculating unit 16 and the zero point correcting unit 13. First, the zero reference value calculating unit 16 determines whether or not the output value Gin from the sensor element 11 is larger than the zero reference value G0 (step ST1). When the output value Gin is larger than the zero reference value G0, the zero reference value calculating unit adds a predetermined value delta to the zero reference value G0 to update the zero reference value G0 (step ST2). In contrast, when the output value Gin is not larger than the zero reference value G0, the zero reference value calculating unit subtracts the predetermined value delta from the zero reference value G0 to update the zero reference value G0 (step ST3). Next, the zero point correcting unit 13 outputs a value Gout which the zero point correcting unit has acquired by subtracting the zero reference value G0 outputted from the zero reference value calculating unit 16 from the output value Gin from the sensor element 11 (step ST4). The initial value of the zero reference value G0 is preset to an appropriate value (e.g. zero), and the zero reference value calculating unit carries out the processing as shown in FIG. 3 at predetermined intervals to update the zero reference value G0.

Figure 4:
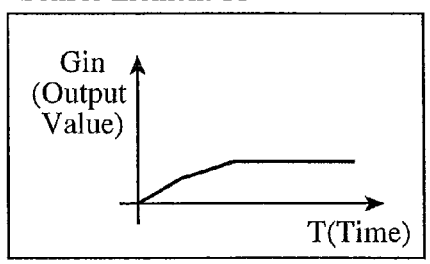
FIG. 4 is a view for explaining the processing carried out by the zero point correcting unit.
Figure 4:
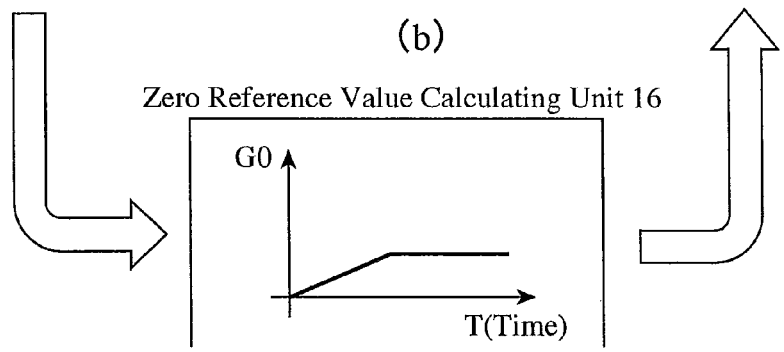
Figure 4:
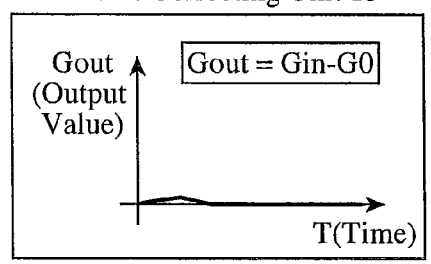

FIG. 4 is a view for explaining the processing carried out by the zero point correcting unit 13.

The zero point correcting unit 13 performs a zero point correction (refer to FIG. 4(c)) by subtracting the zero reference value G0 calculated by the zero reference value calculating unit 16 (refer to FIG. 4(b)) from the output value Gin of the sensor element 11 (refer to FIG. 4(a)) on which A/D conversion has been performed by the A/D converter 12. Because by carrying out the processing as mentioned above, the zero reference value calculating unit updates the zero reference value G0 on the basis of the output value Gin of the sensor element 11, as mentioned above, even when a drift occurs in the output value Gin of the sensor element 11, the zero reference value G0 follows the output value Gin of the sensor element 11 after a fixed time interval has elapsed, and the drift component is then removed. The zero reference value calculating unit 16, which is provided to implement the method of correcting the zero point, can be alternatively disposed outside the front acceleration sensor 1, and the zero reference value G0 calculated by this zero reference value calculating unit 16 can be inputted to the zero point correcting unit 13. As an alternative, instead of being provided with the zero reference value calculating unit 16, the front acceleration sensor can perform a high frequency blocking process on the output value Gin of the sensor element 11 by using an LPF (Low Pass Filter).

Figure 5:
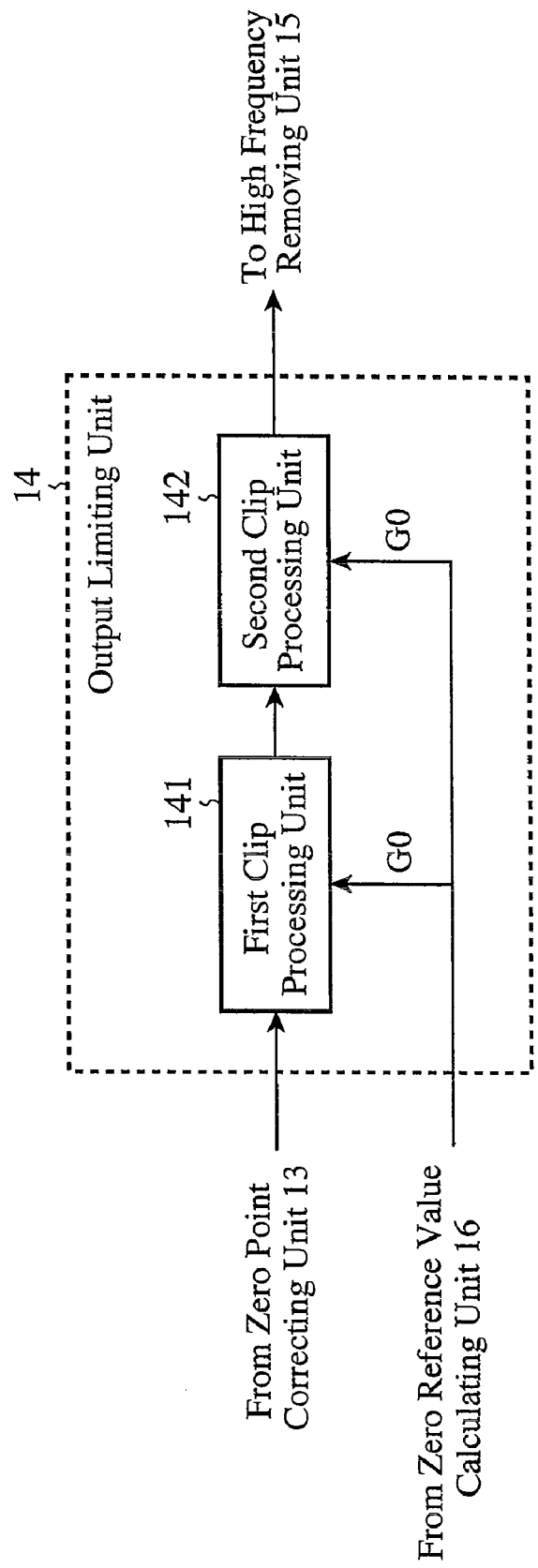
FIG. 5 is a view showing the structure of an output limiting unit.

FIG. 5 is a view showing the structure of the output limiting unit 14, and the output limiting unit includes a first clip processing unit 141 for limiting a maximum value of the output signal outputted from the zero point correcting unit 13, and a second clip processing unit 142 for limiting a minimum value of the output signal.

Next, the operation of the output limiting unit will be explained.

Figure 6:
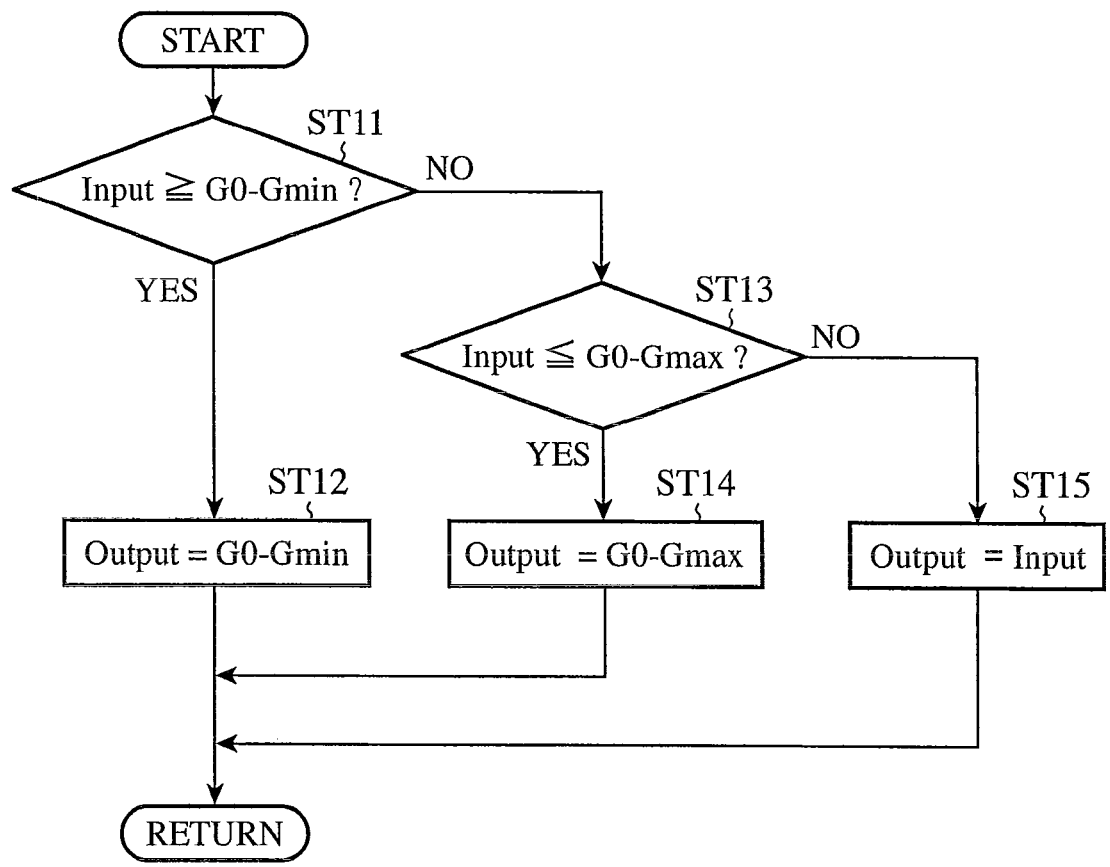
FIG. 6 is a flow chart showing the operation of the output limiting unit.

FIG. 6 is a flow chart showing the operation of the output limiting unit 14. Hereafter, the operation of the output limiting unit 14 which is a main part of the front acceleration sensor 1 will be mainly explained.

After the analog signal outputted from the sensor element 11 is converted into a digital signal by A/D converter 12, the zero point of this digital signal is corrected on the basis of the zero reference value G0 inputted from the zero reference value calculating unit 16 and is then outputted to the output limiting unit 14.

The first clip processing unit 141 of the output limiting unit 14 determines whether or not the value of the signal outputted from the zero point correcting unit 13 is equal to or larger than a value (G0-Gmin) which the first clip processing unit has acquired by subtracting the minimum output value Gmin of the A/D converter 12 from the zero reference value G0 (step ST11), and, when the value of the signal outputted from the zero point correcting unit 13 is equal to or larger than (G0-Gmin), outputs the value (G0-Gmin) (step ST12). In contrast, when the value of the signal outputted from the zero point correcting unit 13 is smaller than (G0-Gmin), the first clip processing unit outputs the value of the signal outputted from the zero point correcting unit 13.

The second clip processing unit 142 determines whether or not the value outputted from the first clip processing unit 141 is equal to or smaller than a value (G0-Gmax) which the second clip processing unit has acquired by subtracting the maximum output value Gmax of the A/D converter 12 from the zero reference value G0 (step ST13), and, when the value outputted from the first clip processing unit 141 is equal to or smaller than (G0-Gmax), outputs the value (G0-Gmax) (step ST14). In contrast, when the value outputted from the first clip processing unit 141 is larger than (G0-Gmax), the second clip processing unit outputs the value outputted from the first clip processing unit 141 (step ST15).

Figure 7:
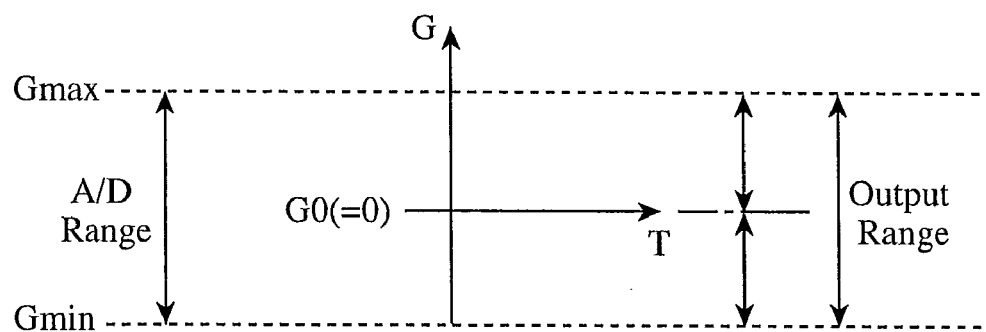
FIG. 7 is a view showing a relationship between the output range of an A/D converter and the output range of the output limiting unit.
Figure 7:
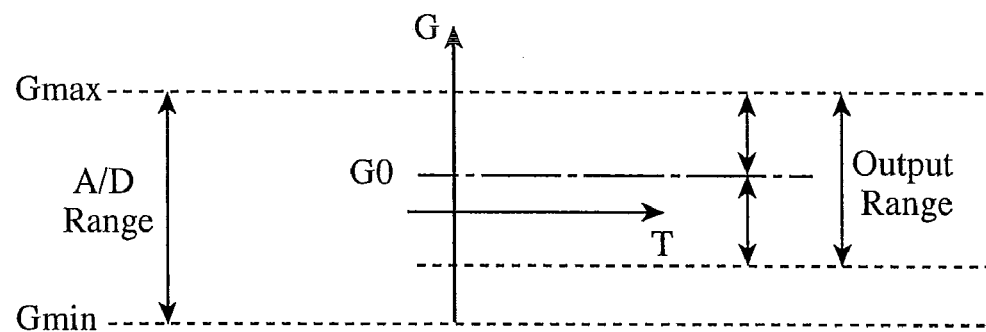

FIG. 7 is a view showing a relationship between the output range of the A/D converter 12 and the output range of the output limiting unit 14. FIG. 7(a) is a view showing a case in which no drift occurs in the zero reference value G0. In this case, because any output limitation using the output limiting unit 14 is imposed on the signal, the output range of the A/D converter 12 can be used to the utmost and therefore the resolution of the A/D converter is not reduced.

FIG. 7(b) is a view showing a case in which a drift occurs in the zero reference value G0.

In this case, an output limitation using the output limiting unit 14 is imposed on the signal and the waveform of the signal has symmetry.

As mentioned above, the front acceleration sensor 1 in accordance with the present Embodiment 1 includes the output limiting unit 14 for limiting the value of the output signal on the basis of the correction amount provided by the zero point correcting unit 13. Therefore, this embodiment offers an advantage of being able to use the output range of the A/D converter 12 to the utmost when no drift occurs in the output of the sensor element 11 without having to have a complicated circuit structure, thereby preventing the resolution of the A/D converter from decreasing. Furthermore, because when a drift occurs in the output of the sensor element 11, the value of the output signal is limited in such a way that the waveform of the signal has symmetry, there is provided an advantage of preventing a signal resulting from a drift from being outputted from the high frequency removing unit 15. In addition, because any signal resulting from a drift is not outputted, there is provided an advantage of enabling the arithmetic operation unit 21 to perform the arithmetic operation with great accuracy, thereby preventing the airbags 3 from malfunctioning.

Figure 8:
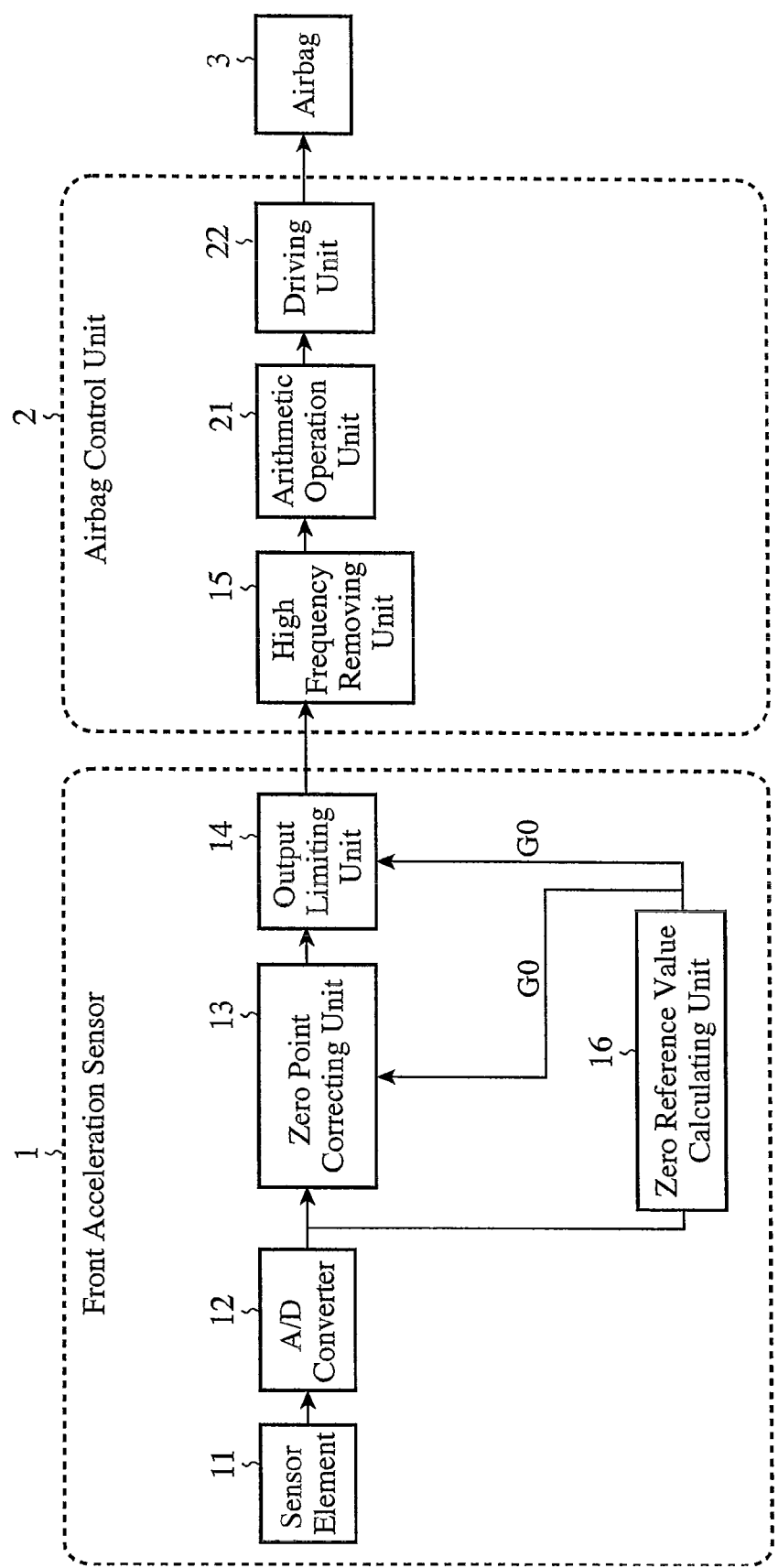
FIG. 8 is a block diagram of another example of the airbag deployment system in accordance with this Embodiment 1.
Figure 9:
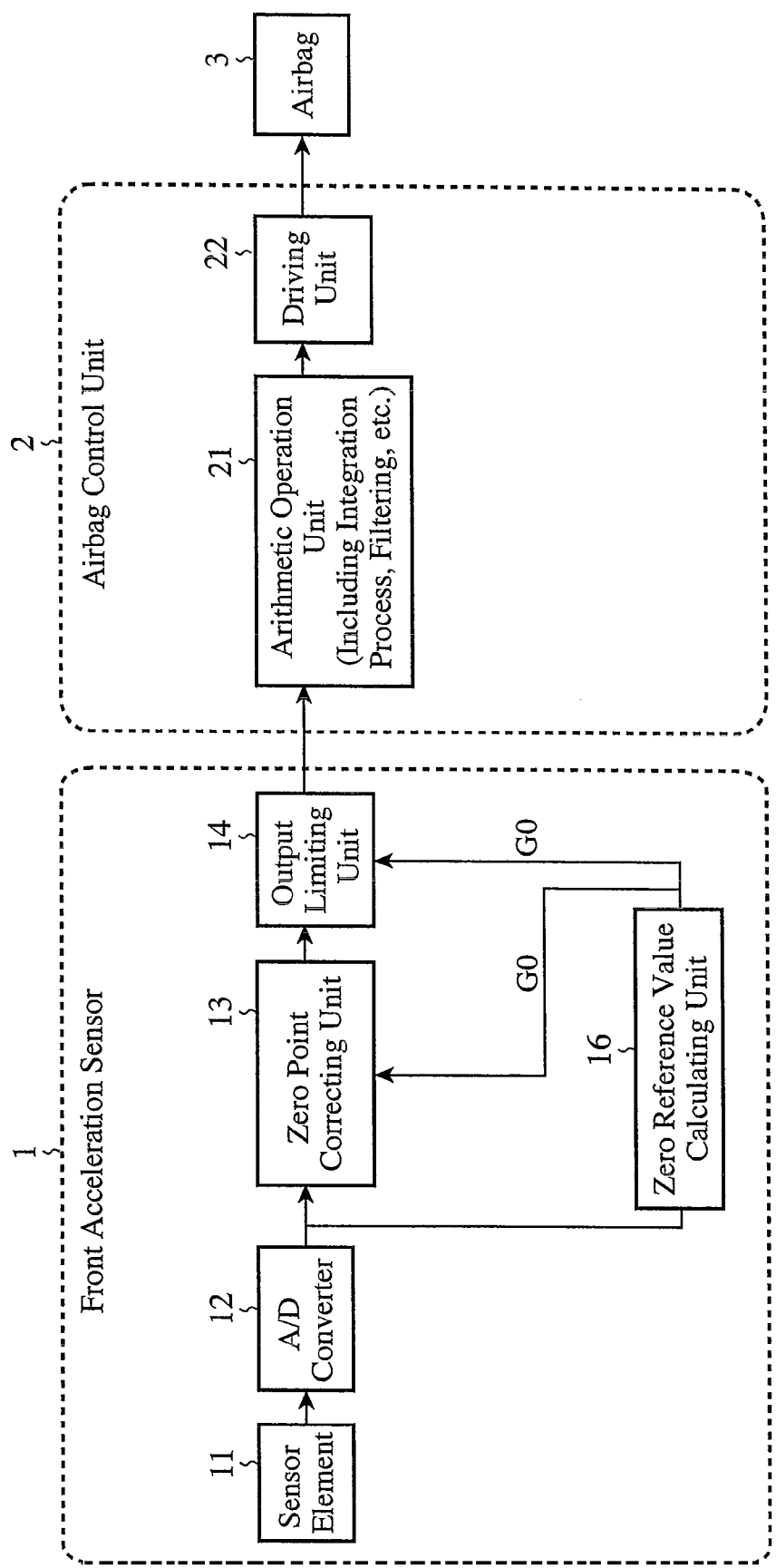
FIG. 9 is a block diagram of another example of the airbag deployment system in accordance with this Embodiment 1.
Figure 10:
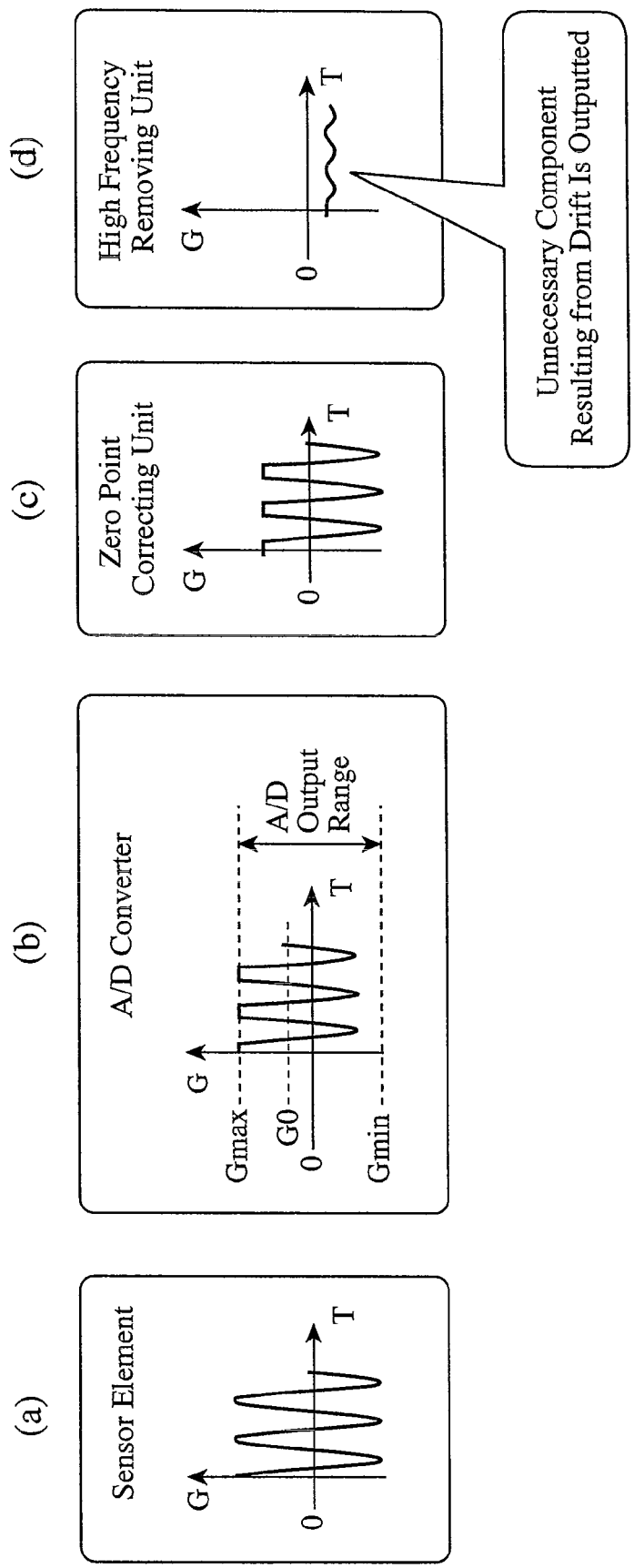
FIG. 10 is a view explaining signal processing carried out by a conventional sensor.

In this Embodiment 1, the output limiting unit 14 is constructed in such a way as to perform an output limitation on the basis of the correction amount provided by the zero point correcting unit 13 when a drift occurs. The output limiting unit 14 can be alternatively constructed in such a way as to, if the above-mentioned correction amount is small, and, even if a signal resulting from a drift is outputted after the processing is carried out by the high frequency removing unit 15, the signal has a value equal to or smaller than a predetermined value and hence presents no problem, perform no output limitations. Furthermore, instead of disposing the high frequency removing unit 15 in the front acceleration sensor 1, the high frequency removing unit 15 can be disposed in the airbag control unit 2, as shown in FIG. 8, or the arithmetic operation unit 21 of the airbag control unit 2 can be constructed in such a way as to carry out the high frequency removing process, as shown in FIG. 9.

INDUSTRIAL APPLICABILITY

As mentioned above, the sensor output correcting device in accordance with the present invention is constructed in such a way as to include the output limiting unit for limiting the value of the output signal on the basis of the correction amount provided by the zero point correcting unit, and can therefore prevent malfunctions without having to have a complicated circuit structure. Therefore, the sensor output correcting device in accordance with the present invention is suitable for use as a sensor output correcting device intended for an air bag system for a vehicle, and so on.

The invention claimed is:

1. A sensor output correcting device comprising:
a sensor element for detecting a variation in an object to be measured, and for outputting this variation as an analog signal;
an A/D converter for converting the analog signal outputted from said sensor element into a digital signal;
a zero point correcting unit for correcting a zero point of the signal outputted from said A/D converter based on a correction amount; and
an output limiting unit for limiting a value of an output signal inputted thereto from said zero point correcting unit on a basis of the correction amount, wherein said output limiting unit comprising:
a first clip processing unit for, when the signal outputted from said zero point correcting unit has a value equal to or larger than a value which said first clip processing unit has acquired by subtracting a minimum value of an output range of said A/D converter from said correction amount, outputting the value which is the subtraction of said minimum value from said correction amount; and
a second clip processing unit for, when a value outputted from said first clip processing unit is equal to or smaller than a value which said second clip processing unit has acquired by subtracting a maximum value of the output range of said A/D converter from said correction amount, outputting the value which is the subtraction of said maximum value from said correction amount.

2. The sensor output correcting device according to claim 1, wherein when said correction amount is smaller than a predetermined value, said output limiting unit does not perform the output limitation.

3. A protection system used for a moving object, comprising:
a sensor output correcting device including a sensor element for detecting a state variation in the moving object, and for outputting this variation as an analog signal, an A/D converter for converting the analog signal outputted from said sensor element into a digital signal, a zero point correcting unit for correcting a zero point of the signal outputted from said A/D converter based on a correction amount, and an output limiting unit for limiting a value of an output signal inputted thereto from said zero point correcting unit on a basis of the correction amount; and
a determining device for determining whether or not to activate a protection member for protecting an object to be protected on a basis of a signal outputted from said sensor output correcting device,
wherein said output limiting unit comprising:
a first clip processing unit for, when the signal outputted from said zero point correcting unit has a value equal to or larger than a value which said first clip processing unit has acquired by subtracting a minimum value of an output range of said A/D converter from said correction amount, outputting the value which is the subtraction of said minimum value from said correction amount; and
a second clip processing unit for, when a value outputted from said first clip processing unit is equal to or smaller than a value which said second clip processing unit has acquired by subtracting a maximum value of the output range of said A/D converter from said correction amount, outputting the value which is the subtraction of said maximum value from said correction amount.

* * * * *